Oct. 31, 1944.　　　S. BOUSKY　　　2,361,741
ROTOR PIVOT

Filed Aug. 2, 1943

INVENTOR.
SAMUEL BOUSKY
BY
Frank N. Harmon
ATTORNEY

Patented Oct. 31, 1944

2,361,741

UNITED STATES PATENT OFFICE 2,361,741

ROTOR PIVOT

Samuel Bousky, Shaker Heights, Ohio, assignor, by mesne assignments, to Jack & Heintz, Inc., Cleveland, Ohio, a corporation of Ohio Application August 2, 1943, Serial No. 497,042

7 Claims. (Cl. 308—178)

This invention relates in general to high speed rotors, such as gyro wheels, and more particularly to improvements in pivots therefor.

In the proper balancing of gyro rotors it has been found that shifts of dynamic balance occur due to temperature variations. It has been common practice to use a gyro rotor whose hub is made of aluminum, magnesium or other light weight material having a high coefficient of expansion and with a pivot made of steel or other rugged material having a relatively low coefficient of expansion. It has been found that as the hub contracts upon decrease in temperature, or expands upon increase in temperature, due to difference in expansion coefficients, a shear stress is built up at the surface boundary between the pivot and hub. Since this shear stress is opposed only by the frictional forces between the two surfaces, slippage occurs between them when the stress becomes sufficiently great. Since the frictional forces are not uniform throughout the surface boundary, when the slippage occurs, a radial as well as axial change of the pivot position occurs, thus altering the dynamic balance and these shifts occur in consequence of an increase as well as a decrease in temperature.

Accordingly the invention has for its primary object to provide a self-contained unitary pivot that will be sufficiently rugged for use in such a high speed rotor as a gyro rotor and yet be pre-thermally stabilized so as to automatically compensate for temperature changes over a wide range.

With this in mind it is proposed to build the pivot primarily of such metal as steel including its bearing end surfaces and to incorporate into the intermediate portion of the hollow barrel of the pivot a hollow barrel, or insert, of metal having a relatively high coefficient of expansion such as aluminum, or the like, and the same coefficient of expansion as the hub of the rotor itself and approximately the same length as the width of the rotor hub so that as the insert and the hub expand and contract uniformly laterally the insert will act to accordingly shift the steel pivot ends and avoid slippage between the same and the rotor hub.

Figure 1:
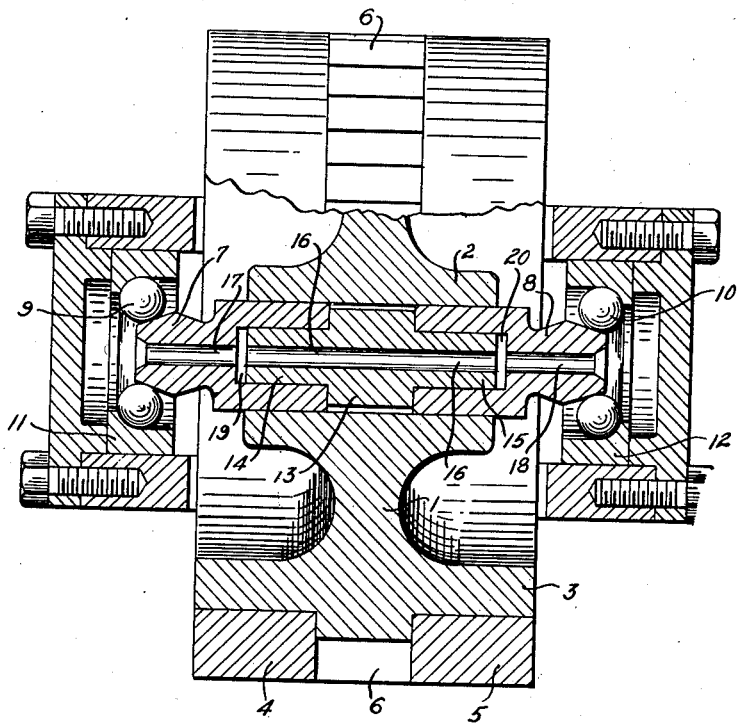
Figure 2:
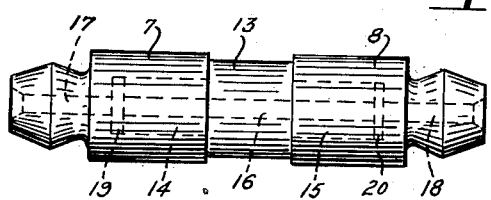

With the foregoing and other objects in view, the invention resides in the combination of parts and in the details of construction hereinafter set forth in the following specification and appended claims, certain embodiments thereof being illustrated in the accompanying drawing, in which:

Figure 1 is a view, partly in end elevation and partly in cross section of a gyro rotor, the axis pivot and the bearings therefor; and Figure 2 is an enlarged view in side elevation of the pivot, showing the interior thereof in dotted lines.

Referring more particularly to the drawing, the rotor 1 itself is of conventional design and construction, the main body portion, including the hub 2 and rim 3 being made of some such light weight metal as magnesium or aluminum having a high coefficient of expansion and separate outer rim strips 4 and 5 of heavy metal applied on either side of the rotor buckets 6.

The rotor is carried by a pivot whose end bearing portions 7 and 8 are rotatably supported by bearing assemblies including balls 9 and 10 and races 11 and 12.

In conventional construction the pivot is made of one piece of steel, as are the bearings therefor, and the rotor and its hub of magnesium. Due to the difference in coefficients of expansion of these two metals, a sharp increase or decrease in temperature brings about a shear stress at the surface boundary between the pivot and hub and since this stress is opposed only by the frictional forces between the two surfaces, slippage occurs when the stress becomes sufficiently great.

In order to obviate this the pivot, instead of being made of one piece of steel, is made of two hollow steel portions 7 and 8 and interposed therebetween is press fitted an aluminum or magnesium web, or insert and of the same material as the rotor hub 2, including a central portion 13 and two integral wing portions 14 and 15. The central portion 13 is preferably of slightly less diameter than the steel portions 7 and 8 so as to not engage the hub 2. The two wing portions lie interiorly of the steel portions 7 and 8 and has its hollow bore 16 align with those, 17 and 18, of the steel portions 7 and 8.

It is to be understood that the choice of magnesium or aluminum for the rotor hub, steel for the pivot ends and magnesium or aluminum and the same material as the hub for the pivot insert are merely preferential and not binding as a limitation insofar as the present invention is concerned. Steel for the pivot ends and bearings is preferred for its durability and low coefficient of expansion. Magnesium or aluminum is chosen for the rotor hub because of its lightness of weight. The important factor, insofar as the pivot insert is concerned is to have it fabricated of the same material as the rotor hub. It may be preferable to form the rotor hub and the pivot insert of aluminum whose coefficient of expansion very closely approximates that of magnesium and at the same time is stronger and more durable as a constituent part of a rotor pivot.

The overall length of the magnesium or aluminum web, or insert, is preferably the same as the width of the rotor hub, leaving clearances 19 and 20 at its opposite ends within the walls of the steel pivot end members 7 and 8 respectively.

Upon temperature increase the hub 2 will expand laterally and likewise contract laterally upon temperature decrease. Due to the difference in the coefficients of expansion of the magnesium, or aluminum, of the rotor hub the tendency ordinarily would be to obtain unequal expansion and contraction of the two resulting in shear stress between the boundary surfaces and slippages and shifts of dynamic balances. However, inasmuch as the coefficient of expansion of the insert is the same as that of the rotor hub, the expansion or contraction of the insert results in the lateral shifting of the steel pivot ends so as to prevent any shear stresses between the boundary surfaces of the steel pivot ends and the rotor hub.

It will be seen from the foregoing that due to the presence of the magnesium or aluminum insert intermediate the two steel pivot end bearing portions, the radial clearance between the insert and the magnesium or aluminum rotor hub and the axial clearance between the wings of the insert and the steel bearing portions, temperature compensation over a wide temperature range from extreme heat to extreme cold has been provided so as to avoid slippages, bindings and shifts of dynamic balances.

I claim:

1. In combination with a rotor, a pivot upon which said rotor is mounted and bearings for carrying said pivot, the hub portion of said rotor being formed of a material of a relatively high coefficient of expansion and the end bearing portions of said pivot being formed of a material of relatively low coefficient of expansion, said pivot having a web portion intermediate of said end portions formed of a material having a relatively high coefficient of expansion.

2. In combination with a rotor, a pivot upon which said rotor is mounted and bearings for carrying said pivot, the hub portion of said rotor being formed of a material of a relatively high coefficient of expansion and the end bearing portions of said pivot being formed of a material of relatively low coefficient of expansion, said pivot having a web portion intermediate of said end portions formed of a material having a relatively high coefficient of expansion substantially equal to that of said rotor hub.

3. In combination with a rotor, a pivot upon which said rotor is mounted and bearings for carrying said pivot, the hub portion of said rotor being formed of a material of a relatively high coefficient of expansion and the end bearing portions of said pivot being formed of a material of relatively low coefficient of expansion, said pivot having a web portion intermediate of said end portions formed of a material having a relatively high coefficient of expansion and of substantially the same length as the width of said rotor hub.

4. In combination with a rotor, a pivot upon which said rotor is mounted and bearings for carrying said pivot, the hub portion of said rotor being formed of a material of a relatively high coefficient of expansion and the end bearing portions of said pivot being formed of a material of relatively low coefficient of expansion, said pivot having a web portion intermediate of said end portions formed of a material having a relatively high coefficient of expansion substantially equal to that of said rotor hub and of substantially the same length as the width of said rotor hub.

5. In combination with a rotor, a pivot upon which said rotor is mounted and bearings for carrying said pivot, the hub portion of said rotor being formed of a material of a relatively high coefficient of expansion and the end bearing portions of said pivot being formed of a material of relatively low coefficient of expansion, said pivot having a web portion intermediate of said end portions formed of a material having a relatively high coefficient of expansion substantially equal to that of said rotor hub and of substantially the same length as the width of said rotor hub, said intermediate web portion being of less diameter than the remaining end portions of said pivot.

6. In combination with a rotor, a pivot upon which said rotor is mounted and bearings for carrying said pivot, the hub portion of said rotor being formed of a material of a relatively high coefficient of expansion and the end bearing portions of said pivot being formed of a material of relatively low coefficient of expansion, said pivot having a web portion intermediate of said end portions formed of a material having a relatively high coefficient of expansion substantially equal to that of said rotor hub and of substantially the same length as the width of said rotor hub, said intermediate web portion including a central portion of less diameter than the remaining pivot end portions and separating the same, the remaining portion of said intermediate web being overlapped by said pivot end portions.

7. In combination with a rotor, a pivot upon which said rotor is mounted and bearings for carrying said pivot, the hub portion of said rotor being formed of a material of a relatively high coefficient of expansion and the end bearing portions of said pivot being formed of a material of relatively low coefficient of expansion, said pivot having a web portion intermediate of said end portions formed of a material having a relatively high coefficient of expansion substantially equal to that of said rotor hub, said web portion and said hub being separately formed and having abutting shoulders whereby said web portion, having a relatively high coefficient of expansion is adapted upon temperature variations to laterally shift said pivot end bearing portions to avoid shear stresses between the boundary surfaces of the latter and the rotor hub.

SAMUEL BOUSKY.